(No Model.)
G. B. PRESCOTT, Jr.
AUTOMATIC REGULATION OF ELECTRIC CIRCUITS.
No. 435,545. Patented Sept. 2, 1890.
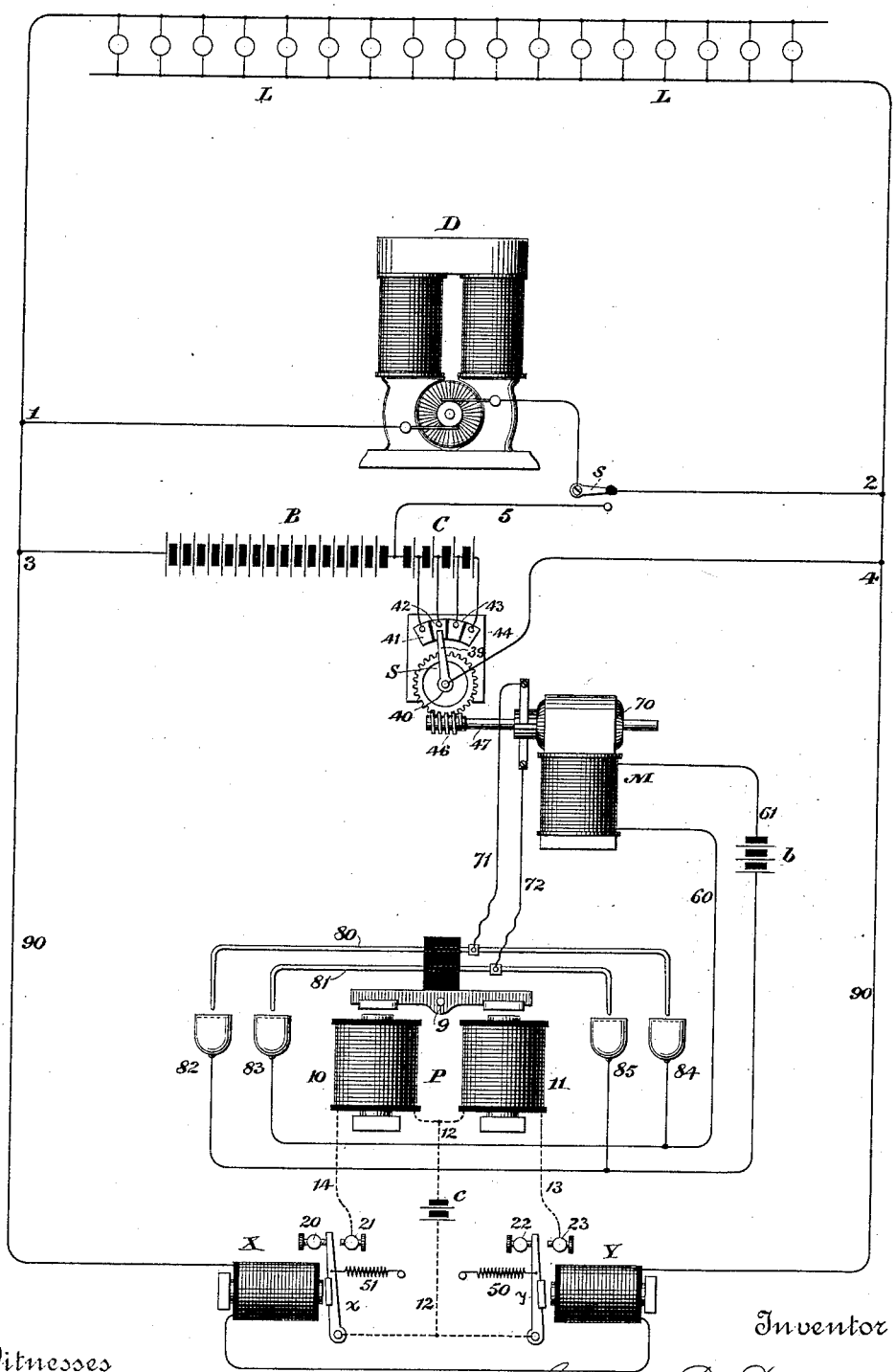
Witnesses
Geo. W. Breck.
Edward Thorpe.
Inventor
George B. Prescott Jr.
By his Attorney

UNITED STATES PATENT OFFICE.

GEORGE B. PRESCOTT, JR., OF NEWARK, NEW JERSEY, ASSIGNOR TO THE ACCUMULATOR COMPANY, OF NEW JERSEY.

AUTOMATIC REGULATION OF ELECTRIC CIRCUITS.

SPECIFICATION forming part of Letters Patent No. 435,545, dated September 2, 1890.

Application filed April 29, 1890. Serial No. 349,926. (No model.)

*To all whom it may concern:*

Be it known that I, GEORGE B. PRESCOTT, Jr., a citizen of the United States, and a resident of Newark, in the county of Essex and State of New Jersey, have invented certain new and useful Improvements in Automatic Regulation of Electrical Circuits, of which the following is a specification.

My invention consists of an arrangement of apparatus operating to regulate the current flowing in an electrical circuit.

I have shown and described my invention in its application to the regulation of current in a distributing system employing secondary batteries. There are a series of electric lights in multiple arc, a secondary battery in a parallel circuit, and a dynamo for supplying both lamps and battery with current, either separately or simultaneously, connected therewith. During variations in load in the lamp-circuit and during the variations in the condition of the battery, due to the process of charging, variations in electro-motive force take place at the terminals of the translating devices, either lamps or batteries.

To preserve and regulate the electro-motive force, I provide an artificial resistance, which may have a counter-electro-motive force—such as a series of secondary battery-cells having small storage capacity as compared with the cells in ordinary use—and I introduce or withdraw these cells one after another, automatically, by the use of an arrangement of apparatus which I have devised for the purpose.

I provide a switch composed of an arm traveling over a series of fixed contact-points. This switch-arm, when operated in one direction or the other, introduces or withdraws sections of artificial resistance or counter-electro-motive-force cells successively. I place a toothed wheel on the shaft carrying this arm and a worm-gear on the shaft carrying the armature of an electric motor, so that by reversing the direction of motion of the motor-armature I can move the switch-arm in either direction.

In a circuit connected to opposite terminals of the circuit to be regulated I place two electro-magnets connected in series. Each of these magnets controls a local circuit. One magnet closes its local circuit on its front contact. The other magnet closes a separate local circuit on its back contact. In these local circuits I place the coils of an electro-magnetic pole-changing switch, which acts in a circuit containing the coils of the motor and operates to reverse the direction of current flowing in the coils of the armature with respect to the field-coils, so that the direction of movement of the armature is changed when the pole-changer is operated. The two magnets controlling the local circuit in which the pole-changer is located are adjusted differently with respect to each other, so that under normal conditions both rest against insulated contact-stops and both local circuits are open. The armature of one magnet is in an attracted position and the armature of the other magnet is in a retracted position. An increase of electro-motive force causes the armature normally retracted to be attracted. A decrease of electro-motive force causes the armature normally attracted to drop off, and in both cases the motor is operated through the local circuit and pole-changer to introduce or withdraw artificial resistance, as has been described, to again establish normal conditions.

The accompanying drawing illustrates my invention.

L is a circuit containing a series of lamps in multiple arc.

D is a dynamo in a circuit 1 2 connected with the lamps.

B is a secondary battery in a circuit 3 4 connected with the dynamo and lamps.

5 is a branch circuit, and *s* is a two-way switch, which when operated substitutes battery B for the dynamo D. There is a series of counter-electro-motive-force cells C. These cells are preferably of small capacity, such as two plain plates of lead or platinum in an electrolyte composed of sulphuric acid and water.

S is a regulating-switch, having a movable arm 39, pivoted at 40. A gear-wheel is fixed to the pivot carrying this arm. The arm moves over a series of fixed contacts 41 42 43 44, and each fixed contact is connected with one of the counter-electro-motive-force cells C. The arm 39 is electrically connected to the conductor 4.

M is an electro-magnetic motor. Its armature 70 is on a shaft 47, carrying a worm-gear 46, meshing with the gear-wheel.

$b$ is a local battery in the circuit 60 61 for operating the motor.

P is a pole-changing switch, composed of four mercury-cups 82, 83, 84, and 85. The opposite ends of arms 80 81 operate in connection with these mercury-cups and are upon an arbor carrying the armature-bar 9.

71 72 is a circuit containing the coils of the armature of the motor M, and its terminals are respectively connected with the tilting arms 80 81 of the pole-changer.

10 and 11 are electro-magnets, each having an armature connected with the armature-bar 9.

X and Y are two electro-magnets connected in series in the circuit 90, which circuit is connected to the terminals of the circuit to be regulated—in this case the lamp-circuit. Magnet X has an armature-bar $x$ and a retracting-spring 51. This spring is so adjusted that under the normal strength of current flowing in the circuit 90 armature-bar $x$ will rest upon the insulating front contact 20.

21 is a contact-stop in the local circuit 14, containing the magnet 10 and local battery $c$.

Magnet Y has an armature-bar $y$ and a retracting-spring 50. This spring is so adjusted that under the influence of the normal strength of current flowing in the circuit 90 armature-bar $y$ will rest upon its insulating back contact 22.

23 is an electrical contact in the circuit 13, containing electro-magnet 11 and local battery $c$. The wire 12 is common to both local circuits.

The operation of the apparatus is as follows: When the electro-motive force of the circuit L is normal, the apparatus stands in the position shown. If the electro-motive force in circuit L decreases for any reason, magnet X will release its armature $x$, and the local circuit, through magnet 10 of the pole-changer P, will be closed, the arms 80 81 will be plunged into the mercury-cups 82 83, and the local circuit containing battery $b$ and the coils of the motor M will be closed, causing the arm 39 of switch S to be moved toward the left, changing its point of contact from 42 to 41, thus withdrawing one of the counter-electro-motive-force cells. The withdrawal of this counter-electro-motive force and artificial resistance will tend to increase the electro-motive force at the terminals of circuit L, magnet X will attract its armature $x$, the circuit of magnet 10 will be broken, the arms of the pole-changer P will resume an intermediate position, breaking the circuit of the motor M, and the normal conditions will be restored. If the electro-motive force at the terminals of circuit L be increased for any reason, the strength of current flowing in the circuit 90 will increase, magnet Y will attract its armature $y$, contact will be made at 23, the local circuit of magnet 11 of the pole-changer P will be completed, tilting arms 80 81 will be plunged into the mercury-cups 84 85, the circuit of motor M will be closed, the coils of the armature being connected in the reversed direction with respect to the field-coils, arm 39 of regulating-switch S will be moved toward the right, as from point 42 to 43, adding a counter-electro-motive-force cell, which tends to decrease the electro-motive force apparent at the terminals of the circuit L, magnet Y will release its armature $y$, the local circuit of contact-magnet 11 will be broken, pole-changer P will resume its normal or intermediate position, the circuit of motor M will be broken, and the normal conditions will be restored. It will thus be seen that whether the electro-motive force at the terminals of the circuit L be increased or decreased the relation of the counter electro-motive-force cells with respect to the circuit will be so changed that normal conditions will immediately be restored, and that this is done by a positive movement and simple apparatus of comparatively inexpensive construction.

What I claim, and desire to secure by Letters Patent, is—

1. The combination of an electrical generator, a circuit containing translating devices supplied with electricity thereby, a secondary battery connected to said circuit, a sectional artificial resistance located in circuit between the generator and translating devices, a switch for gradually introducing and withdrawing said resistance, an electric motor for operating said switch, two separate electro-magnets connected with the circuit to be regulated and responsive to respectively-opposite variations in current therein, a local circuit containing the coils of the motor, a pole-changing switch in said local circuit for reversing the connection of the motor-coils, and a local circuit for operating said pole-changer, controlled by said two electro-magnets, substantially as described.

2. The combination of an electrical generator, a circuit containing translating devices supplied with electricity thereby, a secondary battery connected to opposite terminals of said circuit, a series of counter-electro-motive-force cells, a switch for introducing and withdrawing said counter-electro-motive-force cells, an electric motor for operating said switch, two electro-magnets electrically connected with the circuit containing said translating devices responsive to respectively-opposite variations in current, a local circuit containing the coils of the motor, a pole-changing switch for reversing the connection of the motor-coils, and a local circuit for operating the pole-changer, controlled by said two electro-magnets, substantially as described.

GEORGE B. PRESCOTT, JR.

Witnesses:
DANIEL E. DELAVAN,
V. E. SCHAUMBURG.